US008752181B2

(12) United States Patent
Grzymala-Busse et al.

(10) Patent No.: US 8,752,181 B2
(45) Date of Patent: Jun. 10, 2014

(54) SYSTEM AND METHOD FOR PROVIDING IDENTITY THEFT SECURITY

(75) Inventors: Withold J. Grzymala-Busse, Lenexa, KS (US); Dean R. Vermeire, Lenexa, KS (US); Daniel J. Toughey, Lenexa, KS (US)

(73) Assignee: TouchNet Information Systems, Inc., Lenexa, KS (US)

( * ) Notice: Subject to any disclaimer, the term of this patent is extended or adjusted under 35 U.S.C. 154(b) by 517 days.

(21) Appl. No.: 12/775,987

(22) Filed: May 7, 2010

(65) Prior Publication Data

US 2011/0040983 A1 Feb. 17, 2011

Related U.S. Application Data

(63) Continuation-in-part of application No. PCT/US2008/082901, filed on Nov. 7, 2008, and a continuation-in-part of application No. 11/938,146, filed on Nov. 9, 2007.

(60) Provisional application No. 60/865,127, filed on Nov. 9, 2006, provisional application No. 60/986,278, filed on Nov. 7, 2007.

(51) Int. Cl.
*G06F 21/00* (2013.01)
*G06F 11/30* (2006.01)

(52) U.S. Cl.
USPC .............................. 726/25; 726/26; 713/189

(58) Field of Classification Search
CPC ..... G06F 21/60; G06F 21/602; G06F 21/577; H04L 63/1433; H04W 12/02
See application file for complete search history.

(56) References Cited

U.S. PATENT DOCUMENTS

| 5,991,709 | A | 11/1999 | Schoen |
| 6,757,646 | B2 | 6/2004 | Marchisio |
| 7,139,917 | B2 | 11/2006 | Jablon |
| 7,464,268 | B2 | 12/2008 | Kent, Jr. et al. |
| 7,669,051 | B2 | 2/2010 | Redlich et al. |
| 8,272,064 | B2 | 9/2012 | Kao et al. |
| 2002/0069200 | A1* | 6/2002 | Cooper et al. .................... 707/9 |
| 2004/0103147 | A1 | 5/2004 | Flesher et al. |
| 2004/0133574 | A1* | 7/2004 | Bradford .......................... 707/8 |
| 2005/0004922 | A1 | 1/2005 | Zernik |
| 2007/0036353 | A1 | 2/2007 | Reznik et al. |
| 2007/0162749 | A1* | 7/2007 | Lim .............................. 713/167 |
| 2007/0300306 | A1* | 12/2007 | Hussain ......................... 726/27 |
| 2009/0178144 | A1* | 7/2009 | Redlich et al. .................. 726/27 |
| 2009/0222907 | A1* | 9/2009 | Guichard ........................ 726/17 |
| 2010/0024042 | A1 | 1/2010 | Motahari et al. |

OTHER PUBLICATIONS

Patent Examination Report for AU2008323688, Aug. 14, 2012.

* cited by examiner

*Primary Examiner* — Gilberto Barron, Jr.
*Assistant Examiner* — Abdulhakim Nobahar
(74) *Attorney, Agent, or Firm* — Kutak Rock LLP; Bryan P. Stanley

(57) ABSTRACT

A system and method of providing identity theft security is provided. The system and method utilizes a computer program that identifies, locates, secures, and/or removes from computers, computer systems and/or computer networks personally identifying and/or other sensitive information in different data formats. The computer program utilizes a multi-tiered escalation model of searching/identifying sensitive information. The computer program of the instant invention utilizes a self-learning process for fine-tuning a level of scrutiny for identifying potentially sensitive information.

10 Claims, 8 Drawing Sheets

| Target | Clean |
|--------|-------|
| 0.834  | 0.744 |
| 0.713  | 0.722 |
| 0.710  | 0.223 |
| 0.647  |       |
| 0.338  |       |
| 0.222  |       |
| 0.117  |       |
| 3.579  | 1.689 |

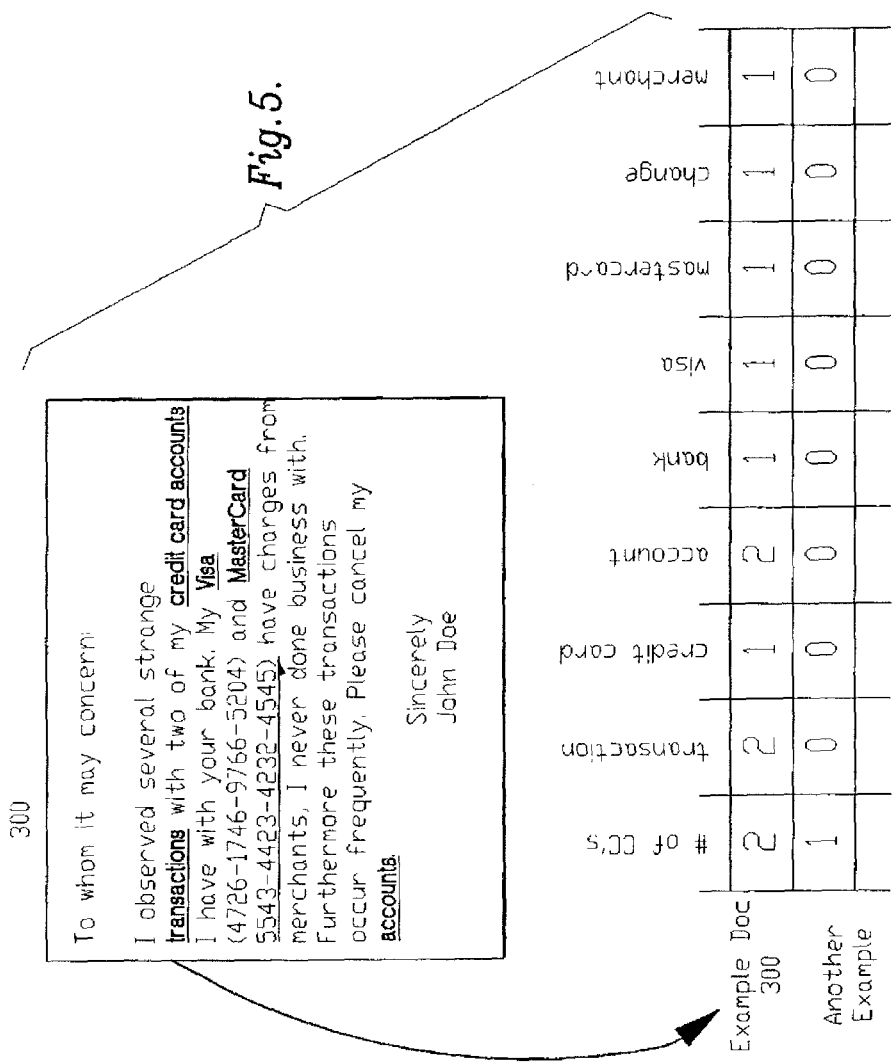

SYSTEM AND METHOD FOR PROVIDING IDENTITY THEFT SECURITY

CROSS-REFERENCE TO RELATED APPLICATIONS

This application is a continuation-in-part of International Application No. PCT/US2008/082901, filed Nov. 7, 2008; and is also a continuation-in-part of U.S. application Ser. No. 11/938, 146, filed Nov. 9, 2007 and which claims priority pursuant to 35 U.S.C. 119(e) to co-pending U.S. Provisional Patent Application Ser. No. 60/865,127, filed Nov. 9, 2006, and U.S. Provisional Patent Application Ser. No. 60/986,278, filed Nov. 7, 2007, the entire disclosures of which are incorporated herein by reference.

FIELD OF THE INVENTION

The present invention relates generally to efforts to protect against identity theft and managing sensitive information. More particularly, the present invention is concerned with a system and method of providing identity theft security and easing the burden of businesses in securing sensitive information and complying with externally-imposed standards of security by identifying sensitive information and quarantining or removing same from computers and computer networks and by intercepting sensitive information and directing its further processing or storage.

BACKGROUND OF THE INVENTION

Identity theft is the fastest growing crime in America. In 2005 10 million Americans had their identities stolen. In 2003, consumers lost $5 billion dollars and business almost $50 billion dollars as a result of identity theft. In particular, educational institutions such as colleges and universities suffer the highest rate of personal data security breaches that may lead to identity theft of students, parents and faculty. As of May 1, 2006, educational institutions accounted for 30% of all such security breaches—according to the Privacy Rights Clearinghouse.

Computers and computer networks often store, transmit and/or receive large amounts of personally identifiable and other sensitive information of the computer users, their customers and/or other parties in various locations that are often unknown to or forgotten about by the computer users. This can become a significant problem in the event of a security breach of a network or a computer system containing such information, and/or in the event a computer containing sensitive information is lost, stolen or otherwise discarded. Although the location and/or existence of the information may be unknown to or forgotten about by the computer user, it is often easily obtained when the computer/network is accessed by a thief/hacker. Therefore, it would be beneficial to provide a system that identifies and locates personally identifiable and other sensitive information and that takes steps to protect such information from improper or unauthorized access in the event a security breach of the computer/network occurs.

Because of the risks associated with collection and storage of personally identifiable and other sensitive information, various industry groups and others have advocated and/or required that entities which receive and/or store personally identifiable and/or sensitive information adopt and implement burdensome security standards and measures. For example, if a business or institution is utilizing a credit card to accept payment from its customers, the business or institution must comply with certain PCI DSS (Payment Card Industry Data Security Standard) or CISP (Cardholder Information Security Program) standards when handling sensitive information of its customers, such as the credit card number, name, etc. For many businesses and institutions, the PCI DSS or CISP standards can be so burdensome that the businesses or institutions will choose not to accept payment via credit cards or to limit severely the circumstances under which credit card payment will be accepted. Nevertheless, accepting credit card payments could provide opportunities that might not otherwise be available to those businesses and/or institutions. It would be beneficial, therefore, to offer a method and system by which a merchant or other enterprise needing to receive and/or access personally identifying or other sensitive information could seamlessly and transparently use and/or otherwise receive the benefits of receiving and using such information without being required to comply with burdensome security standards.

SUMMARY OF THE INVENTION

An object of the instant invention is to provide a system and method of protecting against identity theft. Another object of the present invention is to provide a system and method of providing identity theft security by locating personally identifiable information and/or other sensitive information and securing such information or removing such information from computer systems and/or computer networks. Still another object of the instant invention is to provide a system that identifies and locates personally identifiable and/or other sensitive information and that takes steps to protect such information from improper or unauthorized access or use in the event a security breach of the computer system/network occurs.

The above objects of the instant invention are accomplished through the use of a computer program that identifies, locates, secures, and/or removes from computers, computer systems and/or computer networks personally identifying and/or other sensitive information in different data formats including but not limited to: clear text, pdf's, relational database structures, zipped files, archived files, check21 data, DTMF tones, audio data and digital images. The data targeted by the inventive program includes, but is not limited to: credit card numbers, bank routing numbers and bank account numbers, as well as social security numbers, names, addresses, telephone numbers, medical prescriptions and diagnoses, medical insurance claims and charge forms, x-rays, magnetic resonance image files, and similar diagnostic files. By finding, securing and/or intercepting the data listed above and taking appropriate responsive, remedial, and/or protective measures, the rate of identity theft will decrease.

In preferred embodiments of the instant invention, pattern matching technology and natural language processing is employed by the inventive computer program to find and identify sensitive information. In one preferred embodiment, the searching methodology is based upon a multi-tiered escalation model. Initially the search mechanism looks over the information, broadly utilizing pattern matching via regular expressions. If the preliminary search finds any potentially sensitive information i.e. word and/or number combinations, the data is scanned by a second more sensitive stage. During this second stage the identified information is interrogated on a number of proprietary parameters including but not limited to: key words, phrases, frequency of words, letters and digits, ratios of specific words, and/or digits, based on minimal information entropy and induced from training sets of data. It is then scored and classified using information retrieval tools including, but not limited to, Vector Space Models, Latent Semantic Analysis, Latent Dirichlet Allocation and Bayesian Networks to make a final in-depth determination. The tiered model of the preferred embodiment optimizes search speed and accuracy. Although the preferred embodiment of the multi-tiered escalation model discussed above utilizes two stages, it will be appreciated that additional stages may be utilized without departing from the spirit and scope of the instant invention. Furthermore, it will be appreciated that various information retrieval tools may be utilized at various different stages (e.g. Vector Spaces Models at stage 2, Latent Semantic Analysis at stage 3, etc.).

In one preferred embodiment, the computer program of the instant invention searches one or more of five different data streams/sources for personal information: work station hard drives, network hard drives (SAN's), applications, databases and network traffic (LAN and inbound/outbound Internet traffic). In one embodiment involving computer work station hard drives, the computer program of the instant invention is a software application (agent) running in the background of the work station scanning the local hard drive at times of idleness or other chosen times. Usually this means outside of business hours very early in the day (such as 2:00 am to 4:30 am). To initiate the scan the agent can either communicate with a server or use local search parameters and definitions. The agent will search for files containing data considered personal or sensitive, with the definition of personal and/or sensitive being furnished by personal, user-specific criteria, by legal or industry standards and/or rules, or a combination thereof. The agent can report on its search results either to a server or create a report locally on the workstation. In another embodiment for uses in which having an application on each machine is impractical or inconvenient, a network based scanning agent is provided to scan each work station's hard drive(s). This same scanning agent may also be utilized to scan the network drives for personally identifiable and/or sensitive information.

In an embodiment of the instant invention, the computer program includes one or more plug-ins to certain software applications (mostly servers) to help prevent sensitive data from either entering or leaving those applications. For example, in an embodiment of a plug-in for an email server, the program scans email messages and their attachments before they are sent (outgoing mail) or before the email message is delivered to a client (inbound mail). It will be appreciated that such plug-in may be utilized in combination with the hard drive or network drive scans described above, or alternatively the drive scan and plug-ins may be independent computer programs that are capable of operating independently of each other. It will be appreciated that the plug-in may also be associated with the operating system or systems of the subject computer system and/or network, intercepting personally identifying or sensitive information at the point of input/output.

In several embodiments of the instant invention, the computer program scans databases for personally identifiable information. In one such embodiment the computer program of the instant invention connects to the database via an open database connectivity (ODBC) connection. It then uses SQL queries to search databases for sensitive information. In another embodiment the computer program searches the actual database files found on the hard drive. Using SQL queries provides a smaller chance of corrupting a database than does the direct searching of the actual database; however, searching the actual database allows the computer program to inspect database information at a more granular scale. Therefore, one preferred embodiment of the instant invention utilizes a hybrid database scanning tool that scans a database with SQL queries and that also scans ancillary files of the database (transaction logs, etc.) for additional security coverage.

In several embodiments of the instant invention, the computer program protects computer networks by utilizing an active or transparent proxy. In an embodiment in which an active mode is utilized, LAN based work stations knowingly forward all their proxy compatible traffic to the proxy instead of routing it to the LAN's gateway. The proxy server analyzes both inbound and outbound network traffic (E-Mail, WWW, IM, FTP, etc.) before transmitting it either to the Internet or back to the workstation. In an embodiment in which a transparent mode is utilized, the LAN based work stations are unaware of the proxy. In the transparent mode the traffic seems, from the perspective of the LAN based work stations, to be going out to the network. Nevertheless, the traffic is intercepted at a firewall, router or the like. Instead of the traffic leaving the LAN it is redirected to the transparent proxy. As in the active proxy mode, in the passive proxy mode all traffic is inspected by the transparent proxy before it is forwarded to the Internet or the workstation. In both scenarios (active/passive proxy), the data analysis is identical. Once the data is available, the computer program of the instant invention analyzes the data for any personal and/or other sensitive information.

In another embodiment of the instant invention, the software program utilizes passive network scanning to secure information. The computer program resides as a node of the network (ex: LAN, DMZ) or near the gateway and examines network traffic without being the traffic's gateway or proxy. A passive scanner assembles the traffic and searches the traffic in the same way as a proxy will search the traffic. An advantage to utilizing an active network scanning engine instead of a passive scanning engine is the active engine's response to network traffic that is transferring personal information. A passive engine must first identify that sensitive information is being transferred, only then it may disrupt the connection whether by hijacking the connection (LAN based) or instructing a firewall (DMZ, inbound/outbound) to stop the traffic after the fact. Even though the traffic is stopped, some sensitive information may have already been transferred/accessed before the connection is disrupted. Notwithstanding, an advantage to the use of a passive scanning engine is that it reduces transfer backlogs that can occur during times of high traffic or malfunction with an active engine.

When sensitive information is found on work stations or on the network, the computer program of the instant invention provides several options to mitigate security threats. The least intrusive measure is to flag files or computer IP addresses containing and/or transmitting sensitive data. If that response is insufficient, the offending data are masked or obfuscated from files or network connections. For example, for computer files, means of masking or obfuscating sensitive data include: file encryption, data encryption of sensitive information, replacing the data with dummy values, moving files off-site, replacing sensitive data with a token or a secure http link or moving the data to a sandbox and encrypting it for future use. With respect to network traffic, means for masking or obfuscating sensitive data include: hijacking the connection, blocking the network connection and replacing the original data with another message or with a secure http link where the information maybe accessed.

In a preferred embodiment of the instant invention, a multi-tiered approach is used to prevent the insecure storage or transfer of personal data by utilizing two or more of the embodiments described above in combination. This decreases the number of incidents of identity theft by minimizing the possibility of having unencrypted personal data stored on or transferred to/from a computer or network. This can help to reduce the liability associated with unintentionally releasing sensitive personal data. Although it is preferred to utilize multiple embodiments in combination with each other, it will be appreciated that each embodiment may be utilized alone or in conjunction with other features or embodiments now known or hereafter discovered without departing from the spirit and scope of the instant invention.

The computer program of the instant invention may provide multiple user permission levels to furnish different users various degrees of access to personally identifiable and/or other sensitive information that is identified by the program. Low level users may be prevented from accessing any such information, while other levels of users may have limited access to certain types/categories of information, and high level users will have access to all information.

In addition to sanitizing computers and networks, the instant invention may also be incorporated into other equipment in which or through which personally identifiable and/or other sensitive information may be received, processed, stored, viewed, transmitted, copied, etc. For example, the instant invention may be used in connection with a photocopy machine, scanner, optical character recognition system, or facsimile machine to redact personally identifiable and/or other sensitive information from documents before copies are printed, stored or transmitted. In such an embodiment, the original document may remain unaltered, with only the copies redacted, or alternatively, the original document may also be redacted by the instant invention by combining the input device (e.g. scanner) with an output device (e.g. printer) that redacts the original document. Furthermore, it will be appreciated that the computer program of the instant invention may be utilized to sanitize computers, networks and the like either by removing sensitive/targeted information after it has been stored (e.g. by periodically scanning a computer hard drive), or prior to permitting data to be stored (e.g. by running in the background on a workstation and monitoring all activities that would result in data storage on the workstation's hard drive, in a manner similar to that of the active proxy discussed above).

Another object of the invention is the establishment of a method and system by which merchants or other entities desiring to receive the benefits of having access to personally identifying and other sensitive information may do so without being required independently to comply with externally imposed and other security standards. This object of the instant invention is achieved by a method and computer software system that intercepts on behalf of a merchant or similarly situated entity, at the point of transaction, personally identifying and other sensitive information and then processes, on behalf of that merchant or other entity, such information with third parties such as suppliers, financial institutions, healthcare providers, insurance carriers, and others and then furnishes a customer result such as consummation of a sale, grant of admission or entrance, releases funds, and so on back to the customer of the merchant or other entity, all with the merchant or other entity having no need to take possession of or store personally identifying or other sensitive information, thereby relieving the merchant or other entity from the burden of security maintenance to a substantial extent.

The computer programs of the instant invention may be stand alone programs, or may be offered in connection with a suite of security software. The computer programs may reside on a work station, network, the world wide web, or any other environment now known or hereafter developed. Furthermore, it will be appreciated that various components of a computer program may reside in multiple environments (i.e. one component on a work station, and another component on a network or the world wide web accessible or reachable by the work station). In one embodiment, the instant invention includes both a computer program that identifies, locates, secures, and/or removes from computers, computer systems and/or computer networks personally identifying and/or other sensitive information as well as a payment gateway in which credit card transactions are made through a secure connection that is hosted by the software provider. Although the transaction will appear to the cardholder to be between the cardholder and the user of the software, the software service provider will in fact control the transaction and all data transmitted. This allows the data to be kept in a central location and by a provider that is already skilled and accustomed to storing and protecting sensitive data and that has adopted measures to comply with externally imposed and other data and information security standards. Such a feature allows merchants that would normally shy away from accepting credit card transactions due to the difficulties of PCI DSS or CISP compliance to carry out such transactions with minimal effort.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 5 shows a sample document containing sensitive information to be remediated by the instant invention and illustrates creation of a matrix of attributes for the document.

DETAILED DESCRIPTION OF A PREFERRED EMBODIMENT

As required, a detailed embodiment(s) of the present invention(s) is disclosed herein; however, it is to be understood that the disclosed embodiment(s) is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
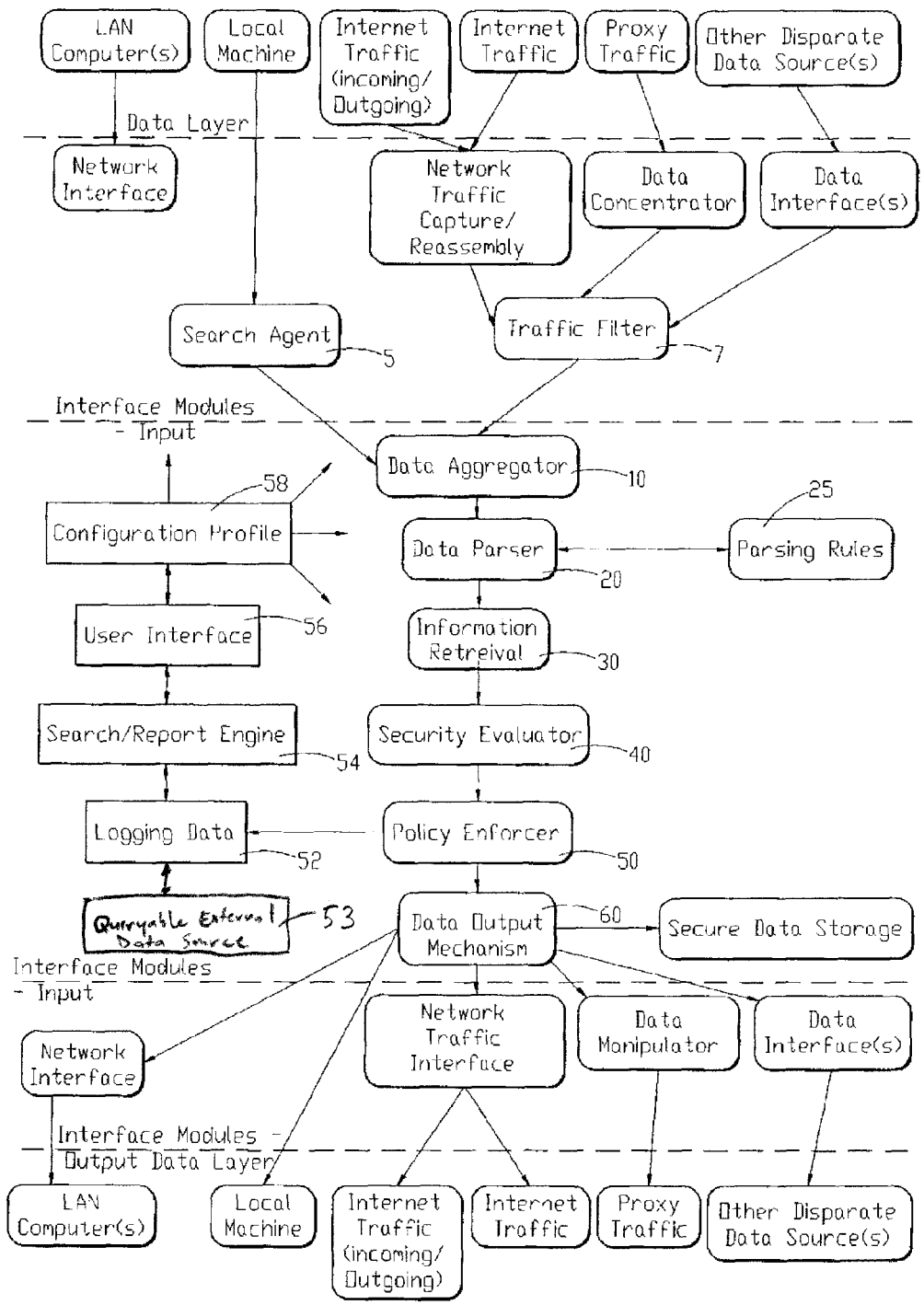
FIG. 1 shows a schematic of a computer program of the instant invention.
Figure 2:
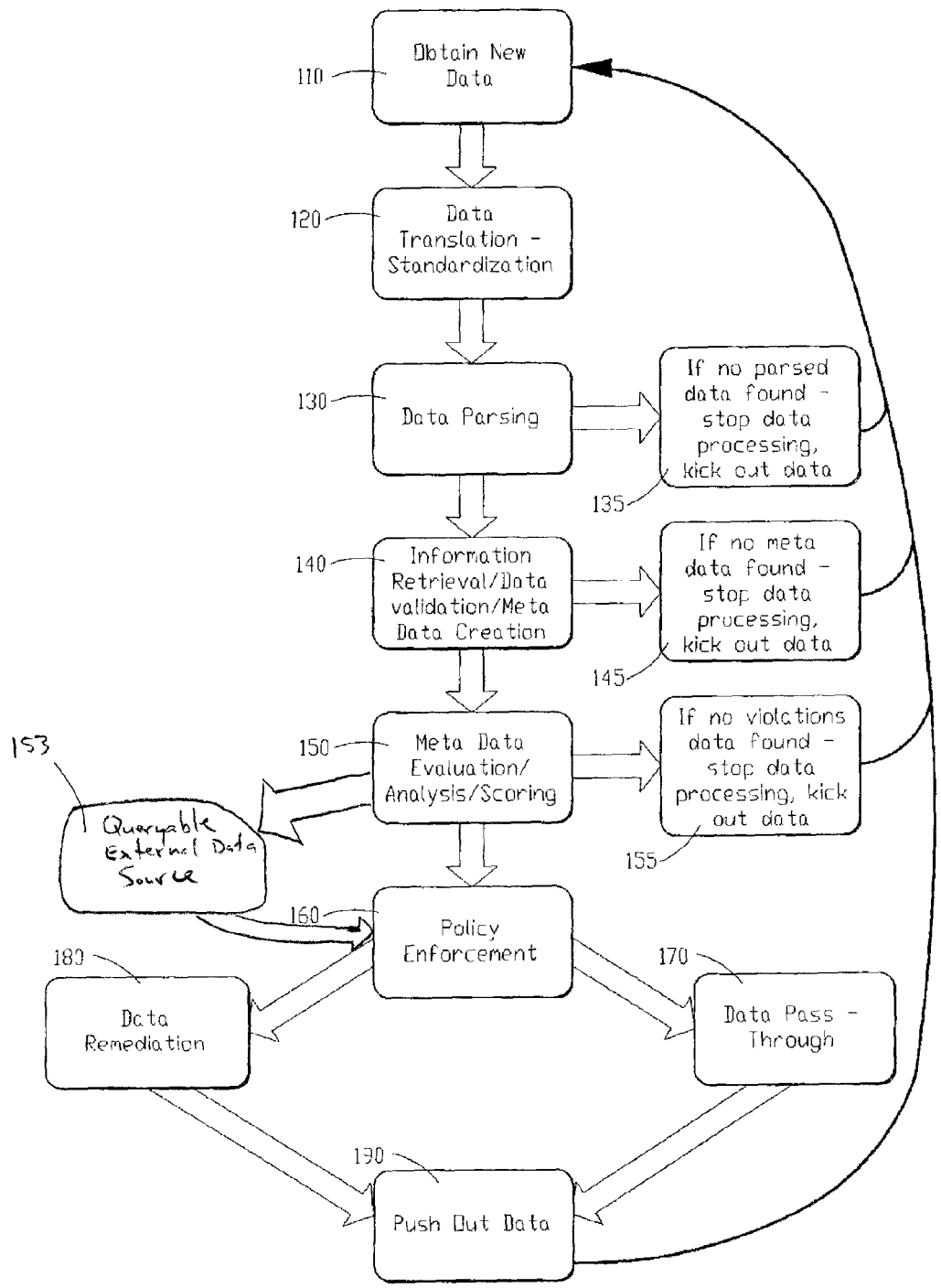
FIG. 2 shows a flow chart of the data identification and sanitization of the instant invention.

Referring to FIGS. 1 and 2, a schematic of a computer program and flow chart of a data identification and sanitization method performed by the computer program of a preferred embodiment of the instant invention is shown and described. As is shown in FIG. 1 (with reference to FIG. 2), the computer program of the instant invention includes a number of program components, routines or subroutines including data aggregator 10 which obtains new data in step 110 (shown in FIG. 2) from a search agent, traffic filter or other data interface or input module (depending upon the data source, i.e. LAN computer, local machine, internet/intranet, proxy, etc.). Data aggregator 10 reads and then translates and/or standardizes the data, which is initially obtained in step 110 in a variety of different possible formats, into a single data format at step 120. Once the data is standardized, it is sent to data parser 20 which uses parsing rules 25 (i.e. broad pattern matching via regular expressions) to look over the standardized data at step 130. If data parser 20 does not find any potentially sensitive information i.e. word and/or number combinations, the data is returned to its original format and pushed out to the data stream through data output mechanism 60 (step 135). If data parser 20 does find potentially sensitive information, the data is analyzed by an information retrieval stage 30 at step 140 to determine if the data "makes sense" (i.e. the data is compared to attributes relating to sensitive information to determine whether the data exhibits any of those attributes—e.g. with respect to a possible credit card number, data parser 20 first identifies a sixteen digit number as being a possible credit card number, and that number is analyzed by the information retrieval stage 30 through the use of credit card companies' check digit or other validation mechanisms to confirm the number meets specifications of a real credit card number) in the context of being sensitive information. If it is determined that the data does not "make sense," the data is returned to its original format and pushed out to the data stream through data output mechanism 60 (step 145). If the data does "make sense" it is scored at step 150 by security evaluator 40. The security evaluator can be set by the user to define a desired level of scrutiny. The level may depend upon the particular data source, or other prerequisites set by the user. If the data is scored below a preset level of scrutiny, the data is returned to its original format and pushed out to the data stream through data output mechanism 60 (step 155). If the data is scored at or above the preset level of scrutiny, the data is sent to policy enforcer 50 at step 160. In one embodiment, as is discussed below with respect to FIG. 10, data that is scored at or above the preset level of scrutiny is further evaluated at step 153 through a validation mechanism that queries a data source (in the embodiment shown in FIGS. 1 and 2, queryable external data source 53) containing actual sensitive information and determining whether the data matches information of the data source. In one embodiment, policy enforcer 50 will use a rule table to evaluate the score and determine whether data remediation (i.e. encryption, flagging, masking, deleting, etc.) (step 180) is necessary, or whether no remediation is required (i.e. data pass-through at step 170). In another embodiment flagged data is reviewed by a system user/operator to manually select the desired remediation option. Once any remediation is completed, the data is returned to its original format and pushed out to the data stream through data output mechanism 60 (step 190); however, with the sensitive information being flagged, masked or obfuscated, as the case may be.

Data is initially obtained and provided to data aggregator 10 in step 110 in a variety of different possible formats (including but not limited to: clear text, pdf's, relational database structures, zipped files, archived files, check21 data, DTMF tones, audio data and digital images) from a data interface or input module. The specific data interface or input module utilized depends upon the data source, i.e. LAN computer, local machine, internet/intranet, proxy, etc. In the context of data received from LAN computers or a local machine (i.e. data stored on such computers/machines), the data interface or input module is a search agent component of the computer program of the instant invention. In the context of data received from internet/intranet traffic or proxy traffic, the data interface or input module is a traffic filter component of the computer program of the instant invention. As is shown in FIG. 1, other data interfaces may be utilized to obtain data from other disparate data sources and provide such data to data aggregator 10 of the computer program of the instant invention. Furthermore, it will be appreciated that alternative data interfaces or input modules may be utilized in place of the search agent and traffic filter described herein without departing from the spirit and scope of the instant invention.

In the context of data received from LAN computers or a local machine (i.e. data stored on such computers/machines), the data interface or input module is a search agent 5 component of the computer program of the instant invention. In the embodiment shown in FIG. 1 involving computer work station hard drives, the search agent component of the computer program of the instant invention is located on the local workstation machine and runs in the background of the work station scanning the local hard drive at times of idleness (or any other desired times) to identify (obtain) documents, database, files and the like (i.e. clear text, pdf's, relational database structures, zipped files, archived files, check21 data, DTMF tones, audio data and digital images) (collectively referred to herein as "data", "documents", "files", or some combination thereof) to be provided to data aggregator 10. In the embodiment shown in FIG. 1 in which the search agent component of the computer program is a network based scanning agent, the search agent component accesses each LAN computer workstation via a network interface to scan each work station's hard drive(s) to identify/obtain data to be provided to data aggregator 10. It will be appreciated that this same network scanning agent may also be utilized to scan the network drives for data to be provided to data aggregator 10. The search agent 5 either makes a copy of the documents/files that is provided to data aggregator 10, or alternatively provides data aggregator 10 with the document/file location to allow data aggregator 10 to access and read the document/file.

The search agent 5 discussed above scans databases for data to be provided to data aggregator 10. In a preferred embodiment, the search agent connects to the database via an open database connectivity (ODBC) connection. In one such embodiment the search agent then uses SQL queries to search databases for potentially sensitive information. In another embodiment the computer program searches the actual database files found on the hard drive. Using SQL queries provides a smaller chance of corrupting a database than does the direct searching of the actual database; however, searching the actual database allows the computer program to inspect database information at a more granular scale. Therefore, one preferred embodiment of the instant invention utilizes a hybrid database scanning tool that scans a database with SQL queries and that also scans ancillary files of the database (transaction logs, etc.) for additional security coverage.

In the context of data received from internet/intranet traffic or proxy traffic, the data interface or input module is a traffic filter component of the computer program of the instant invention. In the embodiment shown in FIG. 1 relating to internet/intranet traffic, the traffic filter component of the computer program is a plug-in (or plug-ins) to software applications that access the internet/intranet to exchange data. For example, in an embodiment of a plug-in for an email server, the traffic filter component scans email messages and their attachments before they are sent (outgoing mail) or before the email message is delivered to a client (inbound mail) through a network traffic capture/reassembly component to provide data to data aggregator 10. It will be appreciated that such plug-in may be utilized in combination with the hard drive or network drive scans described above, or alternatively the drive scan and plug-ins may be independent computer programs that are capable of operating independently of each other. It will be appreciated that the plug-in may also be associated with the operating system or systems of the subject computer system and/or network, intercepting personally identifying or sensitive information at the point of input/output.

In the embodiment shown in FIG. 1 relating to proxy traffic, the traffic filter of the computer program may utilize either an active or transparent proxy (or data concentrator). In an embodiment in which an active mode is utilized, LAN based work stations knowingly forward all their proxy compatible traffic to the proxy instead of routing it to the LAN's gateway. The software program of the instant invention then analyzes both inbound and outbound network traffic (E-Mail, WWW, IM, FTP, etc.) before transmitting it either to the Internet or back to the workstation. In an embodiment in which a transparent mode is utilized, the LAN based work stations are unaware of the proxy. In the transparent mode the traffic seems, from the perspective of the LAN based work stations, to be going out to the network. Nevertheless, the traffic is intercepted at a firewall, router or the like. Instead of the traffic leaving the LAN it is redirected to the transparent proxy. As in the active proxy mode, in the passive proxy mode all traffic is inspected by the computer program of the instant invention before it is forwarded to the Internet or the workstation. In both scenarios (active/passive proxy), the data analysis is identical. Once the data is available, the computer program of the instant invention analyzes the data for any personal and/or other sensitive information.

In another embodiment of the instant invention, the software program utilizes passive network scanning to secure information to be provided to data aggregator 10. The network scanning agent resides as a node of the network (ex: LAN, DMZ) or near the gateway and examines network traffic without being the traffic's gateway or proxy. A passive scanner assembles the traffic and searches the traffic in the same way as a proxy will search the traffic. An advantage to utilizing an active network scanning engine instead of a passive scanning engine is the active engine's response to network traffic that is transferring personal information. A passive engine must first identify that sensitive information is being transferred, only then it may disrupt the connection whether by hijacking the connection (LAN based) or instructing a firewall (DMZ, inbound/outbound) to stop the traffic after the fact. Even though the traffic is stopped, some sensitive information may have already been transferred/accessed before the connection is disrupted. Notwithstanding, an advantage to the use of a passive scanning engine is that it reduces transfer backlogs that can occur during times of high traffic or malfunction with an active engine.

Once data is identified/obtained by the data interface or input module of the computer program of the instant invention and provided to data aggregator 10, data aggregator 10 standardizes (e.g. translates or converts the data to a common format, such as from a non-text format to a text format) the data and stores the standardized set of data in a database. The standardized data is then utilized by data parser 20. Data parser 20 uses parsing rules 25, such as broad pattern matching via regular expressions, to identify potentially sensitive information within the standardized data. If data parser 20 does find potentially sensitive information, the data is analyzed by an information retrieval stage 30 at step 140 to determine if the data "makes sense" in the context of being sensitive information. This is accomplished by comparing the data to a stored list or database of defined attributes relating to sensitive information to determine whether the data exhibits any of those attributes. As is discussed in further detail below, attributes are key words, phrases, or other data descriptors identifying unique features of a document/data. If the data does "make sense" (i.e. the data contains one or more attributes found in documents/data that typically contain personally identifiable or other sensitive information) it is scored at step 150 by security evaluator 40.

In a preferred embodiment of the computer program of the instant invention, security evaluator 40 scores data and evaluates the score compared to a preset level of scrutiny to determine whether the data should be pushed out to the data stream through data output mechanism 60 (step 155), or sent to policy enforcer 50 for possible remediation. In a preferred embodiment, the level of scrutiny is obtained or fine-tuned through a self-learning process of the computer program of the instant invention. It will be appreciated that the self-learning process of the instant invention may be automatic, manual, or a combination of both. It will further be appreciated that the self-learning process of the instant invention may be utilized at any time (prior to, during, after) in the process of identifying personally identifiable information by the computer program of the instant invention.

In a preferred embodiment of the computer program of the instant invention the self-learning process involves first setting the level of scrutiny of the security evaluator to a relatively high level, such that the computer program of the instant invention will identify a relatively high amount of data in a set of data as containing personally identifiable information or other sensitive data (collectively "PII") that does not in fact contain such information ("false positives"). In another preferred embodiment, the level of scrutiny is set at the high level by treating all data deemed as "making sense" in step 140 as containing PII. All data in the set that is identified by the computer program as containing PII is saved into a data corpus. The files in the data corpus are then reviewed to determine which data of the data set was a false positive, and which was correctly identified as containing PII. In a preferred embodiment this is done manually by a system user/operator to ensure accuracy; however it will be appreciated that an automated process may be utilized without departing from the spirit and scope of the instant invention. Data in the data corpus that was correctly determined by the computer program as containing personally identifiable information is considered "target concept" data, and data in the data corpus that was a false positive is referred to as "clean concept" data. In a preferred embodiment, the data corpus is created in a manner so as to be balanced (i.e. each of clean and target concept will contain the same quantity of data files). In another preferred embodiment, the data corpus is created in a manner to ensure a wide spectrum of different data format or file types.

Key words and or phrases (attributes) are identified in each of the target and concept data files that caused the files to be identified as potentially containing PII. This can be done manually by a system user, or may be an automated process of the computer program of the instant invention. Term Frequency/Inverse document frequency weights ("TF/IDF") are created for each attribute and two sets of matrixes accessible by the computer program of the instant invention are created using the TF/IDF weights, one matrix for target concept data and one for clean concept data.

Figures 4, 8:
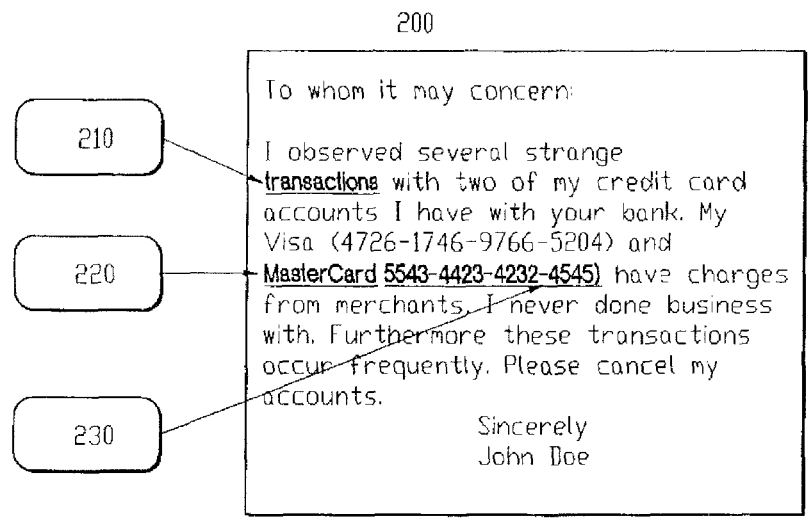
FIG. 4 shows a sample document containing sensitive information to be remediated by the instant invention.
FIG. 8 shows an example of dot products calculated several vectors shown in FIG. 7 to be closest to the new vector.

Referring to FIG. 4, several example attribute types are shown and described herein with respect to document 200. Attributes are data descriptors identifying unique features of a document. Several different types exist including but not limited to: words or phrases; complete word or words; stems (parts of words); numbers; whole numbers or parts of numbers; Meta-Attributes (broad descriptors); file size; number of unique attribute instances; or any other meaningful, definable piece of information about the document or data. Referring to FIG. 4, document 200 includes the stem "transaction" 210, which is part of the word "transactions", the whole word "MasterCard" 220, and credit card number 230. In identifying attributes, keywords/phrases are used in conjunction with PII number patterns to determine whether a document contains PII or not (e.g. a number fitting into a pattern typical of a credit card number format in a document with the keyword "MasterCard" indicates that the document is likely to contain PII) and attributes are selected that differentiate target concept documents from other documents. Good attributes are those words found frequently and mostly in specific concept types. Furthermore, certain combinations of words can also be useful in determining concept type. For example, the phrase "social security" in connection with the word "number" may be considered more likely to contain PII (target concept), while the same phrase ("social security") combined with the word "retirement" may be more likely to not contain PII (clean concept).

Not all words/attributes are created equally. Some words are more likely than others to identify PII (or to identify documents that do not contain PII). Thus, in a preferred embodiment of the instant invention a weighting scheme is utilized to differentiate between more and less important key words. For example, when searching for credit card number PII containing files, the words "this" and the phrase "credit card" have different descriptive importance. "This" provides very little concept information, while the phrase "credit card" adds to an understanding that the data file might contain credit card PII. In the preferred embodiment a TF/IDF or Term Frequency/Inverse Document Frequency weighting scheme is utilized. Term Frequency is a statistical measure used to evaluate how important a word is to a document in a data corpus. Inverse Document Frequency is a measure of the general importance of the term (obtained by dividing the number of all documents by the number of documents containing the term, and then taking the logarithm of the quotient).

Once each keyword/phrase (attribute) is assigned its weighted score, matrixes are created using those scores and stored (e.g. in configuration profile 58) for access by the computer program of the instant invention. One matrix is created for target data sets and another for clean data sets. Referring to FIG. 5, a sample matrix is shown for a target data set for document 300. Each matrix shows the frequency of each keyword/phrase in a data file. In the matrix shown in FIG. 5, columns include frequency of each attribute (i.e. specific key word(s)/phrase(s) and credit card #'s (PII), etc.) and rows show each specific data file. A number of different attributes are shown underlined in document 300 and another document (not shown). For example purposes only all words in the matrix shown in FIG. 5 have been given equal weight, such that the number shown in the matrix in FIG. 5 is the number of occurrences (frequency) of the attribute in document 300. For example, the stem "account" is found in document 300 in two places resulting in a value of two in the column corresponding to the attribute "account". Nevertheless, it will be appreciated that in a preferred embodiment, each attribute receives a weighted score in the manner discussed above.

In the matrix shown in FIG. 5, two credit card numbers have been identified in document 300 as attributes because they are formatted in the manner expected for credit card numbers (i.e. number of digits, arrangement of numbers, first four digits, etc.). Nevertheless, it will be appreciated that the actual individual credit card numbers themselves shown in document 300 may also be attributes that are included in the matrix (either the entire number, or a part of the number). In other words, a list of known credit card numbers may be included in the matrix, such that the frequency of a specific number combination (i.e. "4726174697665204" or "5543442342324545" as shown in document 300) occurring in a document will be included in the matrix. As discussed above, in a preferred embodiment, the number of clean concept files will be equal to the number of target concept data files.

Figure 6:
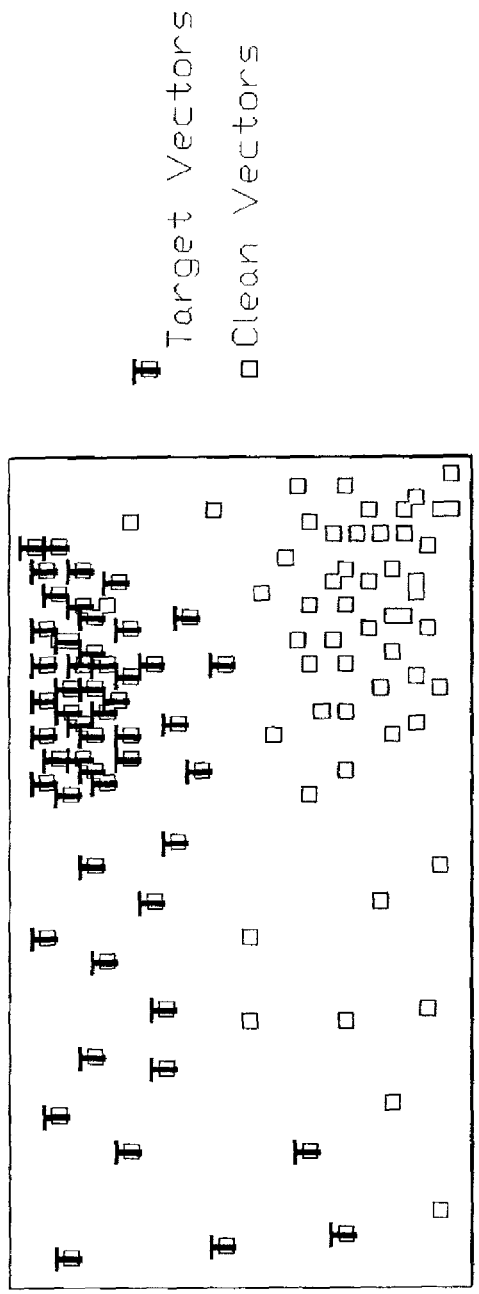
FIG. 6 shows a MDS representation of a vector space to illustrate the learning method of the instant invention.

The rows of the matrixes are utilized by the computer program of the instant invention to create vectors for each data file (clean or target). In the example shown in FIG. 5, individual columns define vector direction and magnitude and the number of columns equal number of dimensions for the vector. The vectors induced from the target and clean data files are then used to create a vector space showing both target and clean concepts. The vector space can be visualized using multi-dimensional scaling (MDS) as is shown in FIG. 6. MDS is a statistical technique used in data visualization, assigning a location of a multi-dimensional item (vector) to a low-dimensional space suitable for graphing.

The vector space created by the clean concept data and target concept data of the data corpus are then used by security evaluator 10 to classify new data as it is analyzed by the computer program of the instant invention. A vector is induced from a new document/file that is being analyzed and stored for access by the computer program of the instant invention, the new vector is compared by evaluator 10 to the pre-classified concept vectors (i.e. clean and target vectors stored for access by the computer program) in the Vector Space and the concept vectors decide (vote) on the membership of the new vector based on the value of the dot product calculated for the closest N vectors to the new vector, where N is user definable depending upon desired sensitivity. By varying the value of N, the user can vary the level of scrutiny obtained by the computer program. Of the N closest vectors, the target vectors "vote" for the new document/file to be classified as target and the clean vectors "vote" for the new document/file to be classified as clean. If the new document/file is closer to more target vectors than clean vectors, the new file is determined to contain PII, and if the new document/file is closer to more clean vectors than target vectors, the new file is determined to be clean (i.e. does not contain PII). As is discussed above, in the preferred embodiment the "closeness" of one vector to another is a weighted score (based upon the dot product) that is calculated by evaluator 10 (e.g. vectors that are very close to each other will have a higher value than vectors that are further apart from one another).

It will be appreciated that certain vector values for, and/or the presence of certain attributes in, a new document/file being evaluated by the computer program of the instant invention may automatically result in the new document/file being classified as either target or clean. For example, any document/file containing the phrase "Confidential—Attorney Client Privileged" may be automatically classified as target. In a preferred embodiment of the instant invention, the computer program accesses a database of attributes that automatically result in a new document/file being classified as target, compares the attributes of the new document/file to the database attributes, and classifies the new document/file as target if the document/file contains any of those attributes. In one preferred embodiment, the database of attributes that automatically result in a new document/file being classified as target includes a list of known credit card numbers.

In will also be appreciated that in addition to creating vectors that include attributes relating to PII, a variety of different vectors can be created to identify virtually any type of information desired to be located utilizing the computer program of the instant invention. In a preferred embodiment, a user is permitted to create custom vectors to enable the computer program of the instant invention to locate documents containing customer-specific data. For example, a user may desire to locate any documents relating to a company's intellectual property. In such case the user could create a custom vector that locates any documents/files containing the words "patent", "trademark", "copyright", "intellectual property", "IP", etc. The user could then fine-tune the sensitivity of the security evaluator 40 in the same or similar manner to that discussed above.

In creating vectors for new files, it is important to use the predefined keywords/phrases already in existence in the Vector Space created by the target and clean concept data (i.e. the Vector Space). New document vector row names must match the Vector Space vector row names. In many cases the vector/matrix for the new document might not have many or any keywords/attributes from the Vector Space (i.e. a Sparse Matrix). Individual row columns define vector direction and magnitude, and all dimensions and dimension definitions must match the classifying vectors (i.e. the clean and target vectors found in the vector space).

Figure 7:
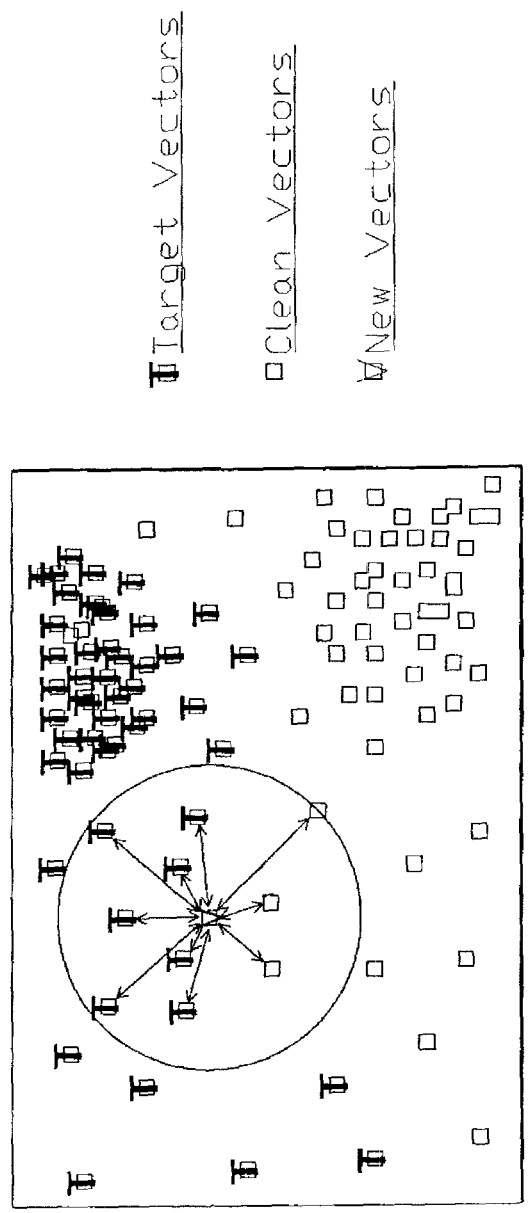
FIG. 7 shows a MDS representation of a comparison of new vector classifying vectors located in a Vector Space.

The dot product of N nearest vector neighbors to the new document/vector is calculated by the computer program of the instant invention and then used by security evaluator 40 to determine the membership of new document vector. Dot product, also known as the scalar product, is an operation which takes two vectors over the real numbers R and returns a real-valued scalar quantity. It is the standard inner product of the Euclidean space. FIG. 7 shows a MDS representation of a comparison of new vector V to the 10 (N=10) closest classifying vectors located in the Vector Space. Summations of dot products for clean and target concepts determine membership classification. FIG. 8 shows an example of dot products calculated for the 10 vectors shown in FIG. 7 to be closest to new vector V. As shown in FIG. 8, the summation of all dot products for target vectors to new vector V totals 3.579, while the summation of all dot products for clean vectors to new vector V only totals 1.689. Thus, the new vector V is classified by security evaluator 40 as target (i.e. the new document/file is classified as containing PII).

Once a new document/file (or the data within a document/file) is classified as containing PII, the data is sent to policy enforcer 50 for remediation. In a preferred embodiment, policy enforcer 50 utilizes a score obtained from security evaluator 40 in determining proper remediation. In one preferred embodiment, the score obtained from security evaluator 40 is based upon the vector summation values discussed above (e.g. a ratio of target summation to clean summation or some other multiplier of target summation and/or clean summation, a preset score for documents automatically classified as target or containing PII based upon certain attributes, etc.). Policy enforcer 50 includes: data log 52 to maintain information regarding actions taken (or not taken) by the policy enforcer with respect to specific data that has been evaluated by policy enforcer 50; search/report engine 54 to allow reports based upon the information stored in data log 52 to be generated by the user; user interface 56 for the user to access the policy enforcer to be accessed and controlled by the user, including but not limited to creating reports, setting rules and scrutiny levels, etc.; and configuration profile 58 to allow the user to configure rules, scrutiny levels, etc. In a preferred embodiment, policy enforcer further includes queryable external data source 53 to allow verification that suspected PII matches actual PII in the queryable data source (discussed in further detail below with respect to FIG. 10).

Figure 9:
FIG. 9 shows a screen shot of a preferred embodiment of a user interface of the instant invention.

Referring to FIG. 9, a screen shot of a preferred embodiment of a user interface 56 that accesses data log 52 of the instant invention is shown. Data log 52 includes a database that includes a listing by name of documents/files that have been classified as containing PII by policy enforcer 50 (suspect files), status for each document/file (i.e. whether any remediation has taken place), a score for each document/file provided by security evaluator 40, frequency information regarding certain key attributes (such as credit card numbers, bank numbers, social security numbers, etc.) for each document/file, files size for each document/file, creation and modification dates and owner names for each document/file. This information aids the system user in determining appropriate remediation for each document/file. In the embodiment shown in FIG. 9 the database of data log 52 further includes a listing of the data that has been identified as containing PII for each document/file, as well as the context data surrounding data that has been identified as containing personally identifiable information. As is shown in FIG. 9, a single document/file is selected (i.e. y2ktest.txt) and details regarding the specific PII identified (threat data), and the data preceding and following the PII in the document/file are displayed in a suspect file details screen to allow a system user to evaluate the data to consider appropriate remediation options. By displaying to the user the threat data as well as the contextual data that surrounds the threat data, the system user can quickly and easily determine the appropriate action to be taken without the need to review the entire document/file. In a preferred embodiment, the user can select the number of characters, or bytes of contextual data to be stored in the database and/or displayed to the user. For example, a user might set the data log 52 to display 60 bytes of data directly preceding the threat data and 60 bytes of data directly following the threat data. In the embodiment of data log 52 shown in FIG. 9, the threat and context data is displayed in the standardized format obtained from data aggregator 10 (i.e. in ASCII textual format). Nevertheless, it will be appreciated that the data could be displayed in various formats depending upon the type of data and the original format of the document/file.

As is shown in FIG. 9, the user can select from a variety of remediation options for the identified threat data by utilizing user interface 56. The remediation options that are performed by policy enforcer 50 include:

1. Acquit—The document/file which the computer program of the instant invention has identified as containing PII is either incorrectly identified or the operator/user does not want to change it or modify its location. The document/file is returned to its original format and pushed out to the data stream through output mechanism 60. In the case of data that has been obtained by search agent 5, the document/file will remain unaltered/unmodified on the computer/machine in which it was originally located by search agent 5. In the case of data that has been obtained by traffic filter 7, the document/file will be allowed to be transmitted in the manner originally intended through the internet, intranet (network traffic interface) or proxy (data manipulator) and without any modifications/alterations to the document/file.

2. Research—The operator cannot make a determination based on the information provided in data log 52. He/she needs to view the whole document before the operator can make a decision, therefore the document/file is displayed through user interface 56 so that the operator can view or research the document/file. In a preferred embodiment, in which the user interface is located at a remote location (such as over a network or the world wide web) from the computer/machine that has been scanned by the program of the instant invention, the user interface will communicate with the search agent 5 or other interface module of the computer program and request that an encrypted copy of the document/file be transmitted to user interface 56 for review by the user.

3. Mask—Data in the document/file that is deemed PII is masked or a large part of the data is replaced by useless characters. The modified/altered document/file is then returned to its original format and pushed out to the data stream through output mechanism 60. In the case of documents/files obtained by search agent 5, the modified/altered/masked document/file will be stored in place of the original document/file on the computer/machine in which it was originally located by search agent 5 (either directly by data output mechanism 60, or through a network interface). In the case of data that has been obtained by traffic filter 7, the document/file will be allowed to be transmitted in the manner originally intended through the internet, intranet (network traffic interface) or proxy (data manipulator) and with the modifications/alterations/masking included in the document/file.

4. Arch/Mask—Data in the document/file that is deemed PII is masked or a large part of the data is replaced by useless characters, and an original copy of the document/file is archived by data output mechanism by encrypting it and storing it in a secure environment/data storage medium. The modified/altered document/file is then returned to its original format and pushed out to the data stream through output mechanism 60. In the case of documents/files obtained by search agent 5, the modified/altered/masked document/file will be stored in place of the original document/file on the computer/machine in which it was originally located by search agent 5 (either directly by data output mechanism 60, or through a network interface). In the case of data that has been obtained by traffic filter 7, the document/file will be allowed to be transmitted in the manner originally intended through the internet, intranet (network traffic capture/reassembly interface) or proxy (data manipulator/concentrator) and with the modifications/alterations/masking included in the document/file. It will be appreciated that the data storage medium may be located on the machine in which the data is originally located (or from which it originated), or alternatively the data storage medium may be located on a network drive, on a storage medium accessible or the world wide web, or on any other storage medium accessible by data output mechanism 60.

5. Wipe—in the case of data obtained by search agent 5, the document/file is erased (either directly by data output mechanism 60 or through the network interface) from the hard drive (or other storage medium) of the machine in which it was discovered by "erasing" it and then the sector on the hard drive where it resided is written over with random data and erased several times to remove the possibility of un-erasing the original document/file. In the case of data that has been obtained by traffic filter 7, the document/file is erased and not allowed to be transmitted in the manner originally intended through the internet, intranet (network traffic interface) or proxy (data manipulator).

6. Arch/Wipe—in the case of data obtained by search agent 5, the document/file is erased (either directly by data output mechanism 60 or through the network interface) from the hard drive (or other storage medium) of the machine in which it was discovered by "erasing" it and then the sector on the hard drive where it resided is written over with random data and erased several times to remove the possibility of un-erasing the original document/file, and an original copy of the document/file is archived by encrypting it and storing it in a secure data storage environment. In the case of data that has been obtained by traffic filter 7, the document/file is erased and not allowed to be transmitted in the manner originally intended through the internet, intranet (network traffic capture/reassembly interface) or proxy (data manipulator/concentrator), and an original copy of the document/file is archived by encrypting it and storing it in a secure data storage environment. It will be appreciated that the data storage medium may be located on the machine in which the data is originally located (or from which it originated), or alternatively the data storage medium may be located on a network drive, on a storage medium accessible or the world wide web, or on any other storage medium accessible by data output mechanism 60.

7. Restore—A document/file or data that has been archived is restored by data output mechanism 60 by taking the archived copy, decrypting it and moving it to its original location, or another location. In a preferred embodiment, the name of the restored file is optionally changed from the original file name to prevent a file name conflict.

Figure 3:
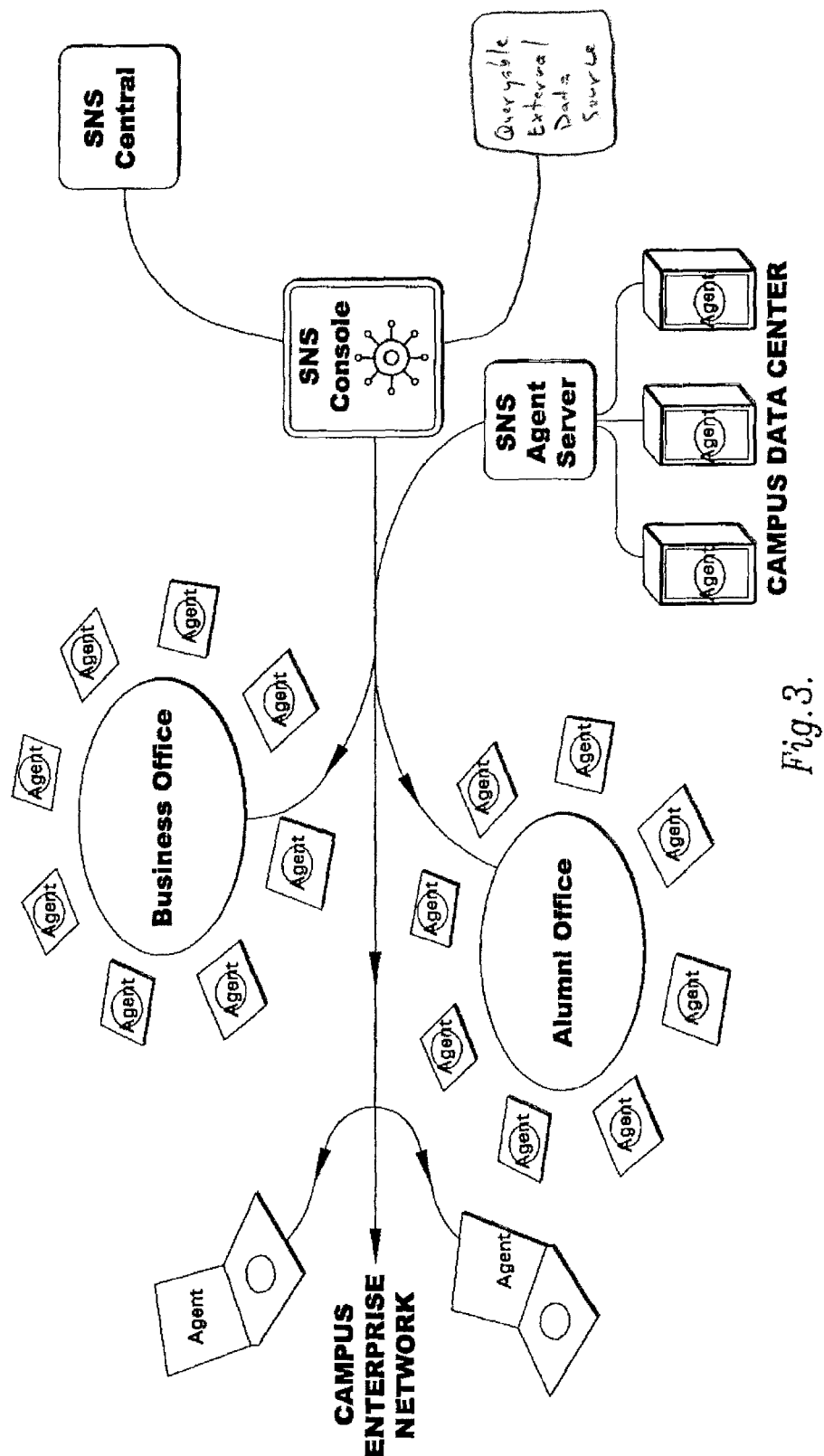
FIG. 3 shows a schematic diagram of a network-based computer program of a preferred embodiment of the instant invention.

Referring to FIG. 3 a schematic diagram of a network-based computer program of a preferred embodiment of the instant invention is shown. In the embodiment shown in FIG. 3, the computer program of the instant invention is shown in connection with a small section of an enterprise network of a typical university or college campus, which includes a network connection to a number of computer workstations located in clusters in various offices and locations across the campus, including but not limited to the campus business office, alumni office and data center. In addition many campus personnel often utilize laptop computers that are transported by the personnel to and from the campus and home.

In the embodiment of the computer program shown in FIG. 3 and with respect to college campus enterprise networks, the primary types of PII include: credit card numbers (receipts, transaction logs, authorization or settlement files/spreadsheets, and student information systems (SIS)); banking information (ACH files, transaction logs, spreadsheets and SIS); and social security numbers (such numbers are the most pervasive as many student identification numbers are the same as the student's social security number).

The computer program of the embodiment shown in FIG. 3 includes three basic components, an Agent Scanning Engine, a User Console and a Central Search/Report Engine. The Agent Scanning Engine is a computer application that is located on each individual computer/machine located on the network and selected to be scanned for PII by the instant invention.

The Agent Scanning Engine of the preferred embodiment includes Search Agent 5, data aggregator 10, data parser 20 (and parsing rules 25), information retrieval stage 30, security evaluator 40, policy enforce 50 and output data mechanism 60, as those components are described above. The User Console of the preferred embodiment includes data log 52, user interface 56 and configure profile 58, as those components are described above. The Central Search/Report Engine of the preferred embodiment includes search/report engine 54 as that component is describe above. It will be appreciated that numerous alternative components and/or alternative arrangements of components for each of the Agent Scanning Engine, the User Console and the Central Search/Report Engine may be utilized without departing from the spirit and scope of the instant invention.

In a preferred embodiment the Agent Scanning Engine is deployed to the various computers/machines on the network through the use of an Agent Server. The Agent Server "pushes" out the Agent Scanning Engine software to all machines desired to be scanned automatically. Once the software is "pushed" out by the server, the selected computer installs the software automatically. By using the Agent Server it is not necessary to install the Agent Scanning Engine manually on each computer/machine. This method of installation saves time and hassle.

In a preferred embodiment, the Agent Server is a stand alone piece of hardware that sits on the network. Its purpose is to push the software out to the selected computers/machines. Once it pushes the Agent Scanning Engine software to the recipient computers, the Agent Server provides to the User Console an install base list of the computers to which the Agent Scanning Engine software has been deployed. It will be appreciated that various alternative methods of installing the Agent Scanning Engine software to individual computers may be utilized without departing from the spirit and scope of the instant invention, including but not limited to manually installing the software on each computer and generating the install base list manually. Furthermore it will be appreciated that the Agent Server functionality can reside on the same hardware as the User Console, or any other suitable hardware capable of accessing the network.

One copy of the Agent Scanning Engine is placed on each computer in the network that is to be scanned/searched for PII. The User Console utilizes the install base list and establishes/tests/checks the connection with each Agent Scanning Engine via the enterprise network to ensure there are no connectivity problems due to personal firewalls or machines refusing to accept server pushes. The Agent Scanning Engine is activated and/or controlled/instructed by a configuration file (configuration profile 58) provided to the Agent Scanning Engine from the User Console. The configuration file is created/edited by the operator via the User Console. The configuration file includes information regarding which machines and what parameters are to be scanned. The configuration file is sent to each Agent Scanning Engine, and each Agent Scanning Engine scans the local hard drives of the computer in which it is deployed and remediates PII files in the manner discussed above. Because each machine includes a separate Agent Scanning Engine, scans of all machines on a network may be conducted simultaneously, regardless of the number of machines. Thus minimize the total scan time for the enterprise network, regardless of the number of machines.

Each Agent Scanning Engine utilizes the configuration files and searches the machine on which it is located to identify PII documents/files and create a data log of all such documents found. The Agent Scanning Engine of the preferred embodiment uses Vector space technology to identify PII data in the same or similar manner discussed above. The Agent Scanning engine tries to comprehend the data and classifies it, creates a mathematical model of each document (i.e. vector), compares the document to what is already known (i.e. concept data) and classifies the document by voting. The computer program of the instant invention, which utilizes vector spaces learns from examples. In a preferred embodiment, the "learning" takes place globally through the User Console, so that all Agent Scanning Engines will provide identical search results. Nevertheless, it will be appreciated that "learning" through vector spaces of the instant invention may also be accomplished individually by each Agent Scanning Engine. The "learning" process of the instant invention provides the benefits of high accuracy, a quick cleanup process, and adaptability (i.e. the computer program of the instant invention can learn on each campus or separate computer network based upon the specific type of documents/files located on the network).

Once an Agent Scanning Engine finishes its scan of a machine it reports its results to the User Console through data log 52. The User Console is a single, centrally located application that controls all of the Agent Scanning Engines that are located on the network. The User Console controls all Agent Scanning Engines at the same time, creates configuration files/profiles specified by operator and provides such files to the Agent Scanning Engines, monitors real time updates of each Agent Scanning Engine's progress, displays data logs generated by each Agent Scanning Engine to the operator, and provides remediation instructions to the Agent Scanning Engines (e.g. in the manner above with respect to FIG. 9). The User Console may be located directly on a machine on the campus enterprise network, or alternatively, the User Console may be located on a machine (such as that of a third party service provider) that accesses the campus enterprise network via the world wide web or other suitable network connection.

The operator reviews the data log for a machine received from the Agent Scanning Engine and displayed via the User Console and provides instructions for remediation. As is discussed in detail above with respect to FIG. 9, the operator may instruct the Agent Scanning Engine to encrypt, move, mask, or wipe documents/files, or any combination thereof. In a preferred embodiment, the operator of the User Console is a person having a relatively high security level in the organization in which the enterprise network is located (e.g. a chief security officer, IS personnel, or outside consultant/security advisor). Access to the User Console is restricted via strong user authentication, such as two-factor authentication with a strong password and biometrics, to prevent unauthorized access to the PII information located by the instant invention. Such a high level of security is important in that the data log files provided to the User Console from the Agent Scanning Engines will contain the PII data that has been located. In a preferred embodiment all data log files are provided to the User Console in an encrypted format and are stored in a secure location. In another preferred embodiment magnetic stripe track data (the data found on the back of a credit card on the magnetic stripe) and CVV/CVV2 data (the three or four digit security code number found on the back of a credit card near the signature line) are never propagated and are not included in the data log provided to the User Console. Instead, a place marker is created in the log file that indicated such data has been found and that identifies its location (i.e. machine name/number, file name, etc.). In another preferred embodiment, military wiping and NSA standard—AES Encryption is utilized for remediation.

In a preferred embodiment, the Central Search/Report Engine is located in a PCI certified data center of a third party service provider that is connected to the campus enterprise network via the world wide web. In addition to providing services relating to the installation, operation and maintenance of the computer program of the instant invention, the third party service provider may also offer consulting services regarding various merchant programs and hardware options relating to the instant invention. In one embodiment the third party service provider intercepts on behalf of the university/college, at the point of a transaction, personally identifying and other sensitive information and then processes, on behalf of the university/college, such information with third parties such as suppliers, financial institutions, healthcare providers, insurance carriers, and others and then furnishes a customer result such as consummation of a sale, grant of admission or entrance, releases funds, and so on back to the customer of the university/college, all with the merchant or other entity having no need to take possession of or store personally identifying or other sensitive information, thereby relieving the merchant or other entity from the burden of security maintenance to a substantial extent. The Central Search/Report Engine communicates with and receives information from the User Console and provides numerous reports, statistics and trends relating to the operation of the computer program of the instant invention.

In a preferred embodiment the Central Search/Report Engine is only permitted access to "scrubbed" data logs. No PII is contained in any data logs for the reports, etc. generated by the Central Search/Report Engine. This allows users that do not require access to PII, such as a school Chancellor, or information officer to monitor the progress of security initiatives without creating unnecessary risks of theft/disclosure of PII. Such persons would utilize a login and password that provides access to the Central Search/Report Engine and which is different than the login/password that provides access to the User Console.

In a preferred embodiment of the Central Search/Report Engine, a page or screen of the Central Search/Report Engine displays an inventory of all payment devices for an organization (i.e. POS credit card machines, etc.) as well as what departments within an organization have what merchant ids. Such information is collected by a third party service provider/consultant that reviews the organization on-site and creates, an inventory list and stores the inventory list is a database accessible by the Central Search/Report Engine. Other information/reports that are provided by various embodiments of the instant invention (either alone or in combination) include, but are not limited to: merchant activity (i.e. dollars of sales made for example through an embodiment of the instant invention in which a third party service provider provides services relating to consummation of a sale transaction) by department over a period of time; information regarding computer inventory scans, such as which machines in an organization have been scanned to locate PII and which have not, when scans were conducted and when future scans are scheduled, information regarding number of PII threats found over a period of time (can be broken down by department, etc.), total number of PII files found during searches, top 10 computers on network where PII has been found, rank all computers on a network where PII is found, rank computers in groups; information regarding remediation, such as information regarding status of remediation (i.e. number of files that have been wiped, masked, secured or still pending review), information regarding remediation choices made (i.e. on a global bases for all machines in a network), percentage completion of remediation and average time for remediation. Such reports may be provided in a variety of formats to allow system users to easily visualize the information, including but not limited to, bar graphs, tables, line graphs and pie charts. In addition, spread sheet reports may be provided to display information including but not limited to scans broken down by computer including information such as computer name, domain name, date of scan, scan type (such as credit card, social security number, banking/ACH data, etc.) and date of next scheduled scan; and remediation results broken down by computer, including information such as computer name, domain name, date of scan, number of files scanned, frequency of key attributes (such as credit card numbers, social security number or bank routing/account numbers) located in files, and percentage of completion of remediation.

In a preferred embodiment of the invention, all connectivity between the components (Agent Scanning Engine, User Console and Central Search/Report Engine) is accomplished via a secure SSL connection over TCP-IP.

Figure 10:
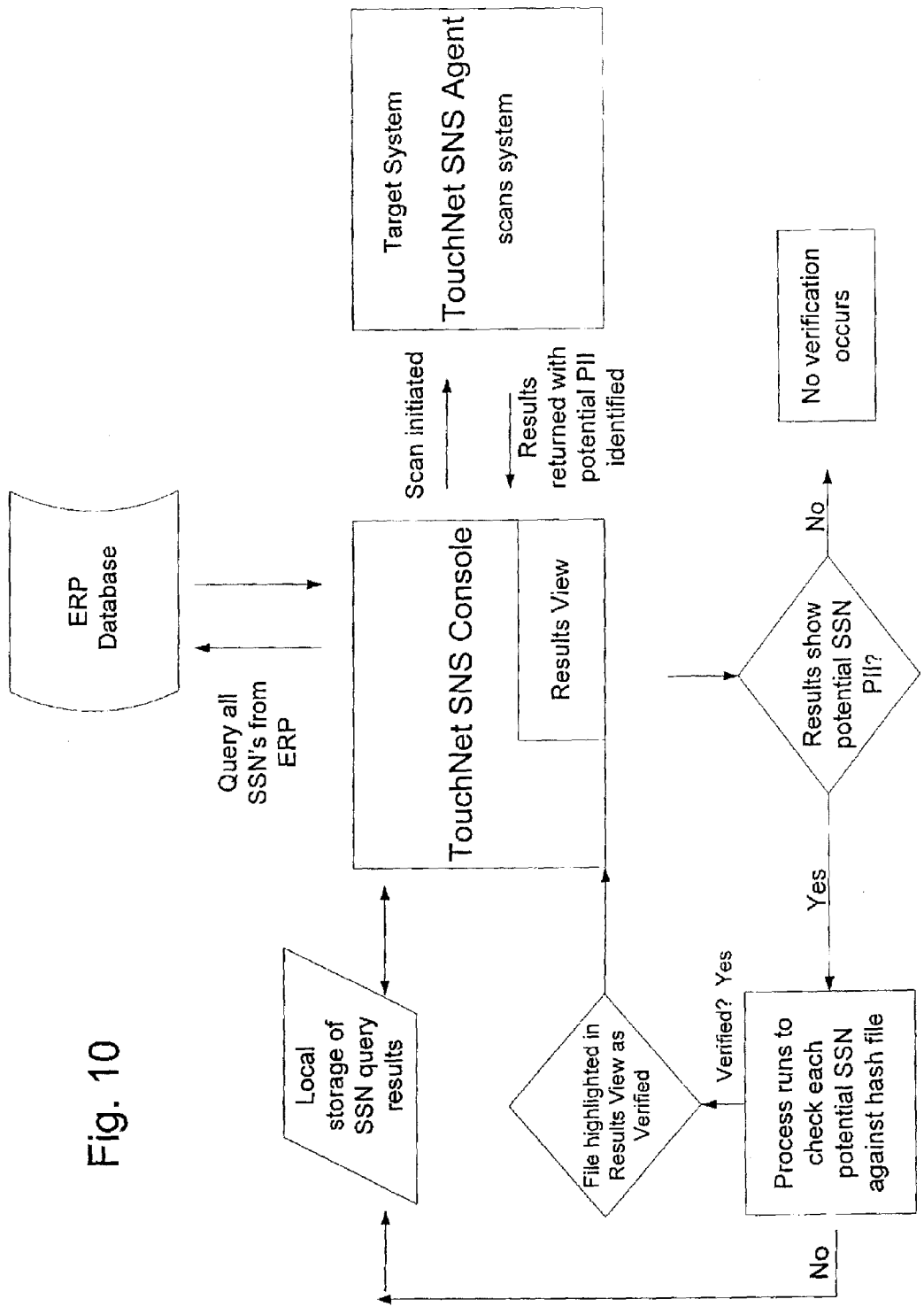
FIG. 10 shows a workflow of an embodiment of the instant invention that includes a validation mechanism.

In preferred embodiments the computer program of the invention includes a validation mechanism (i.e. software program or program subroutine) that verifies whether suspect files (documents, etc.), which have been identified through the software of the instant invention as believed to be containing PII, do in fact contain data that is known PII. The validation mechanism verifies suspect files by comparing the suspected PII from those files with known PII stored in databases (or other storage locations) in which the PII legitimately exists (i.e. databases, queryable data sources, or storage locations where records containing PII are intended to be maintained, as opposed to random locations on computers/machines being searched by the software of the instant invention in which PII is not intended to be maintained). An exemplary embodiment of the validation mechanism of the instant invention is shown in FIG. 10 in connection with a network based computer program the same or similar to that discussed above with respect to FIG. 3 that includes an Agent Scanning Engine, and a User Console. Although not shown in FIG. 10, the network based computer program of FIG. 10 may also include a Central Search/Report Engine that is the same or similar to that discussed above with respect to FIG. 3. Furthermore, it will be appreciated that although shown in connection with a network based computer program, the validation mechanism of the instant invention may also be utilized in connection with (or reside on) a work station, network, the world wide web, or any other environment now known or hereafter developed.

Referring to FIG. 10, the Agent Scanning Engine and User Console function in the same or similar way as is described above with respect to FIG. 3. The User Console controls the Agent Scanning Engine through a configuration file that is provided to the Agent Scanning Engine by the User Console. The scan of the computer/machine on which the Agent Scanning Engine is located is initiated pursuant to the direction of the configuration file provided by the User Console. Suspected PII is identified by the Agent Scanning Engine and reported to the User Console in the manner discussed above (i.e. through a data log). In the embodiment shown in FIG. 10, the validation mechanism is initiated by the User Console. Nevertheless, it will be appreciated that the validation mechanism of the instant invention may also be initiated by the Agent Scanning Engine.

As is shown in FIG. 10, once the Agent Scanning Engine reports suspected PII to the User Console, the User Console initiates the validation mechanism by first determining whether the suspected PII is the type of PII that can be verified through the use of the validation mechanism of the instant invention. In the embodiment of FIG. 10, the validation mechanism of the invention is designed to verify that a suspected social security number located by the Agent Scanning Engine is in fact a social security number of an individual that is somehow affiliated with the enterprise network that is being searched (for example a student or faculty member of a university or college campus). Although shown in connection with verification of a social security number, it will be appreciated that the validation mechanism of the instant invention is not limited to verification of such, and may be used in connection with verification of various types of data, including but not limited to student ID numbers, PIN numbers, passwords, addresses, birthdates, bank account numbers, credit card numbers, etc. If the suspected PII is of the type that cannot be verified through the validation mechanism (i.e. in the exemplary embodiment of FIG. 10, if the suspected PII is not a possible social security number), no verification occurs and the suspected PII (or document/file/etc. in which the suspected PII is located) is shown as suspected PII in the scan results view of the User Console interface (such as is shown in FIG. 9 discussed above). If, however, the suspected PII is of the type that can be verified through the validation mechanism (i.e. in the exemplary embodiment of FIG. 10, if the suspected PII is in the form of a possible social security number), the validation mechanism of the instant invention compares the suspected PII with known PII stored in databases (or other storage locations or queryable data sources) in which the PII legitimately exists.

In the exemplary embodiment shown in FIG. 10, the validation mechanism utilizes a hash file that is stored locally (with respect to the User Console) for access by the validation mechanism to more quickly determine whether the suspected PII corresponds to actual PII legitimately located in a separate, external, database (or storage location or queryable external data source). The hash file is based upon (or created from) the actual PII data in the external database using a hash function to turn the desired actual PII (i.e. list of social security numbers) into an array of hash values. The validation mechanism utilizes the hash function (algorithm) to turn the suspected PII (suspected social security number) into a hash value that serves as an index into the hash file. If the hash value matches a value in the hash file, the suspected PII is verified as corresponding to actual PII (directly, or through further processing). The document/file/etc. in which the verified PII is then highlighted, flagged or otherwise identified in the scan results view of the User Console as having been verified and the results of the validation mechanism process (i.e. that the suspected PII has been verified as corresponding to actual PII) is stored in a database or file (such as a local database) that is accessed by the User Console. If the hash value does not match a value in the has file, the suspected PII is not verified and merely remains shown in the scan results view as being suspected PII (i.e. no flag or other identification as being verified), and the result of the validation mechanism process (i.e. that the suspected PII has not been verified) is stored in the database or file for access by or reporting through the User Console.

Although the exemplary embodiment shown in and discussed in connection with FIG. 10 utilizes a hash file to more quickly verify suspected PII, it will be appreciated that the use of a hash file is not required in connection with the instant invention. In one alternative embodiment, the validation mechanism of the instant invention directly searches the database (i.e. through SQL or other queries) in which the actual PII is legitimately stored to determine if the suspected PII matches any actual PII within the database.

In the embodiment shown in FIG. 10, the database in which the actual PII is legitimately stored, and which is used to verify suspected PII by the validation mechanism of the instant invention, is an ERP (Enterprise resource planning) database (or databases). The User Console is set up in the ERP system as a client to allow transactions through the ERP modules. Nevertheless, it will be appreciated that the validation mechanism of the instant invention may be configured to be a client of, and therefore access, any database, storage location or other queryable external data source on the enterprise network (or accessible by the validation mechanism—such as an Alumni system of a university or a LDAP system, or a credit card bank identification number, BIN, database) in which actual PII is legitimately stored. It will further be appreciated, that the validation mechanism of the instant invention may access multiple modules/databases/locations on the enterprise network to verify a single (or each) suspected PII item.

In the embodiment of the invention shown in FIG. 10, the ERP (or other database, data source, or storage location) is initially accessed by the User Console to create the hash file prior to initiation of the validation mechanism of the invention. In the example of FIG. 10, in which the PII being verified is social security numbers, the User Console software program will run all actual social security numbers in the ERP through the hash function to create the hash file. In an alternative embodiment, a file may be created that contains all actual social security numbers. The use of the hash file, however, is preferred in that it does not require any actual PII to be stored locally for access by the User Console (only the hash file is stored locally). In the embodiment in which the actual social security numbers is contained in a file, such file information may be utilized by the Agent Scanning Engine to immediately verify whether suspected PII is an actual social security number within the ERP during the scan of the computer/machine. In addition to the security concern (i.e. having a full copy of actual PII on the local machine being scanned) such an embodiment is less desirable than verification after the suspect PII has been reported to the User Console because comparison of every suspected social security number against a file containing every actual social security number in the ERP is much more time consuming and therefore reduces performance.

In a preferred embodiment, the validation mechanism of the instant invention compares a predetermined number of suspected PII items in a single document for verification. The predetermined number may be preset into the User Console, or may be set at a number (or percentage or other measure of completeness) by the operator. For example, in the embodiment shown in FIG. 10, a document being scanned by the Agent Scanning Engine may contain a list of 1000 items of suspect PII that appear to be social security numbers. The validation mechanism of the instant invention may be set to compare up to 200 suspect PII items (or alternatively 20% of total items in a document, etc.) with the actual social security numbers in the ERP system. If after comparing the first 200 suspect PII items from the document, none of those items is verified as being an actual social security number from the ERP system, the document will be reported (i.e. shown/displayed) in the scan results view of the User Console as not being verified (i.e. shown as normal without being flagged or identified as verified).

In a preferred embodiment of the instant invention, the validation mechanism conducts its transactions with the ERP or other database(s) or storage locations (i.e. accesses the databases to compare suspected PII with actual PII) of actual PII automatically. In another preferred embodiment, the transactions are conducted during the night or other off-peak hours to reduce traffic to the database(s).

In another preferred embodiment, the operator that accesses the User Console has the option of performing or initiating the validation mechanism manually. In this embodiment, the operator selects a particular document shown in the scan results view of the User Console, and selects an option (i.e. toggles a button, etc.) to initiate the validation mechanism.

In a preferred embodiment of the instant invention, when a document is verified to contain actual PII that is legitimately stored in certain locations on the enterprise network, the operator of the User Console is provided an option to perform additional comparisons of data from the document with data legitimately stored on the enterprise network. In the example of FIG. 10, the operator selects the verified document (that contains an actual social security number) in the scan results view of the User Console and toggles a button to select the option for additional data comparisons. The validation mechanism then sends additional requests to (conducts additional transactions with) the ERP (such as an SQL query for specific data fields), requesting additional data that is associated with the verified social security number, such as student name, PIN, birth date, address, student number, etc. In one embodiment (or as one operator selectable option) the User Console then sends a one file scan request (i.e. drill-down or zoom-in scan) to the Agent Scanning Engine with the full file path/name of the specific document, and the queried PII data to search against (a special configuration file type) and the Agent Scanning Engine returns the results of additional PII violation (new data type) matches found in the file and displays such results in the scan results view of the User Console. In another embodiment (or user selectable option) the User Console requests to download the full document from the Agent Scanning Engine, and compares the data in the ERP query results with the text in the document and displays any additional PII violation matches found in the document in the scan results view of the User Console.

In a preferred embodiment, a log is kept regarding the amount of suspected PII that is confirmed to be actual PII through the validation mechanism of the instant invention. In one preferred embodiment, the log is kept with respect to each individual document. The log data for an individual document can then be used to score the document in the same or similar manner discussed above with respect to the security evaluator.

The validation mechanism of the instant invention helps to reduce the number of false positives obtain for suspected PII; thus increasing user confidence in the results obtained by the Agent Scanning Engine of the instant invention.

In one preferred embodiment, the validation mechanism of the instant invention is used to compare suspected PII against a database containing actual PII (such as social security numbers) of individuals that are deceased. If a document contains PII of a deceased individual, the document is flagged or otherwise identified as such in the scan results view of the User Console. This verification is useful for fraud protection as well as for updating of records.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A system for minimizing the risk of theft or disclosure of personally identifiable or other sensitive information on a computer network comprising:
   a scanning engine located on a computer or work station on the network to identify personally identifiable or other sensitive information on said computer or work station;
   a user control console in communication with said scanning engine; and
   a report engine in communication with said control console;
   wherein said user control console provides a configuration profile to said scanning engine, monitors the scanning engine, receives a data log from said scanning engine, and provides remediation instructions to said scanning engine based on said data log.

2. The system as claimed in claim 1 further comprising a remediation engine to take action with respect to said personally identifiable or other sensitive information pursuant to said remediation instructions.

3. The system as claimed in claim 2 wherein the action taken by said remediation engine is selected from the group consisting of acquitting, researching, masking, achieving/masking, wiping, achieving/wiping, and restoring.

4. The system as claimed in claim 1 wherein said scanning engine utilizes Vector Space Models to compare attributes of scanned data to attributes of similar concept data files stored in a configuration profile for said scanning engine.

5. The system as claimed in claim 4 wherein said scanning engine receives said concept data files from said user control console via said configuration profile.

6. The system as claimed in claim 1 wherein said data log is provided to said user control console in an encrypted format and is stored in a secure location.

7. The system as claimed in claim 1 wherein a place marker is created in said log file for identifying certain sensitive information is not included in said data log provided to said user control console.

8. The system as claimed in claim 1 wherein said user control console is located at a location on the network that is remote from said computer or work station.

9. The system as claimed in claim 8 wherein said scanning engine comprises a plurality of scanning agents each located on a separate computer or work station on the network.

10. The system as claimed in claim 1 wherein said user control console includes a validation mechanism in connection with a storage location for identifying actual sensitive information.

\* \* \* \* \*